(12) United States Patent
McQuinn et al.

(10) Patent No.: US 8,833,685 B1
(45) Date of Patent: Sep. 16, 2014

(54) UNIVERSAL NUTCRACKER

(71) Applicant: Jerry E. McQuinn, Kokomo, IN (US)

(72) Inventors: Jerry E. McQuinn, Kokomo, IN (US);
Lee B. McQuinn, Lennox, MI (US)

(73) Assignee: Jerry E McQuinn, Kokomo, IN (US)

( * ) Notice: Subject to any disclaimer, the term of this patent is extended or adjusted under 35 U.S.C. 154(b) by 0 days.

(21) Appl. No.: 14/092,439

(22) Filed: Dec. 6, 2013

(51) Int. Cl.
*A47J 43/26* (2006.01)

(52) U.S. Cl.
USPC ......... 241/169; 241/262; 30/120.2; 30/120.5; 99/581

(58) Field of Classification Search
CPC ....................................... A47J 43/26
USPC .............. 241/169, 169.2, 264, 266; 30/120.1–120.5; 99/567, 568, 571, 99/572, 588, 578, 582
See application file for complete search history.

(56) References Cited

U.S. PATENT DOCUMENTS

| | | | | | |
|---|---|---|---|---|---|
| 343,351 | A | * | 6/1886 | Watrous | 30/120.3 |
| 483,334 | A | * | 9/1892 | Wheeler et al. | 30/120.5 |
| 484,049 | A | * | 10/1892 | Robertson | 30/120.4 |
| 851,210 | A | * | 4/1907 | Wheaton | 30/120.3 |
| 1,003,917 | A | * | 9/1911 | Konarski | 30/120.4 |
| 1,123,852 | A | * | 1/1915 | Costa | 30/120.3 |
| 1,205,276 | A | * | 11/1916 | Sharpe et al. | 30/120.5 |
| 1,318,182 | A | * | 10/1919 | Schiemer | 99/579 |
| 1,698,620 | A | * | 1/1929 | Clark | 30/120.3 |
| 1,930,056 | A | * | 10/1933 | Klingler | 241/169 |
| 2,174,080 | A | * | 9/1939 | Davis | 30/120.5 |
| 2,269,306 | A | * | 1/1942 | Davis | 30/120.5 |
| 4,077,121 | A | * | 3/1978 | Waller | 30/120.3 |
| D248,814 | S | | 8/1978 | Bayly | |
| 4,200,042 | A | | 4/1980 | Scholz | |
| 4,554,737 | A | * | 11/1985 | Bartels | 30/120.3 |
| 5,174,026 | A | | 12/1992 | Writt | |
| 5,361,688 | A | * | 11/1994 | Blankenship | 99/572 |
| 5,390,591 | A | * | 2/1995 | Fast | 99/578 |
| D472,119 | S | | 3/2003 | Burrows | |
| 6,786,142 | B2 | * | 9/2004 | Milich | 99/572 |
| 6,807,961 | B2 | | 10/2004 | Burrows | |
| D634,845 | S | | 3/2011 | Gao | |
| 2003/0106952 | A1 | * | 6/2003 | Coleman et al. | 241/264 |

FOREIGN PATENT DOCUMENTS

FR          1029351 A   *   6/1953   ............. A47J 43/26

OTHER PUBLICATIONS

Ornamental & Figural Nutcrackers an identification & value guide Copyright Judith A. Rittenhouse 1993.
The Art and Character of Nutcrackers The Leavenworth Nutcracker Museum Copyright Arlene Wagner 2005 ISBN 1-933112-08-5.

\* cited by examiner

*Primary Examiner* — Mark Rosenbaum
*Assistant Examiner* — Leonel Vasquez
(74) *Attorney, Agent, or Firm* — Frank D Lachenmaier

(57) ABSTRACT

The Universal Nutcracker is set of jaws with an increasing opening between top and bottom jaws to allow for cracking different diameter nuts connected by a set of linkages. Each jaw has a set of teeth for gripping the shell of the nut to be cracked. A torsion spring is connected between the top and bottom center lever to assist in opening the jaw set after the nut has been cracked. Ends of top and bottom center levers are then coupled to a scissoring arms with linkage assembly for opening and closing with a mechanical advantage.

1 Claim, 5 Drawing Sheets

UNIVERSAL NUTCRACKER

Figure 1:
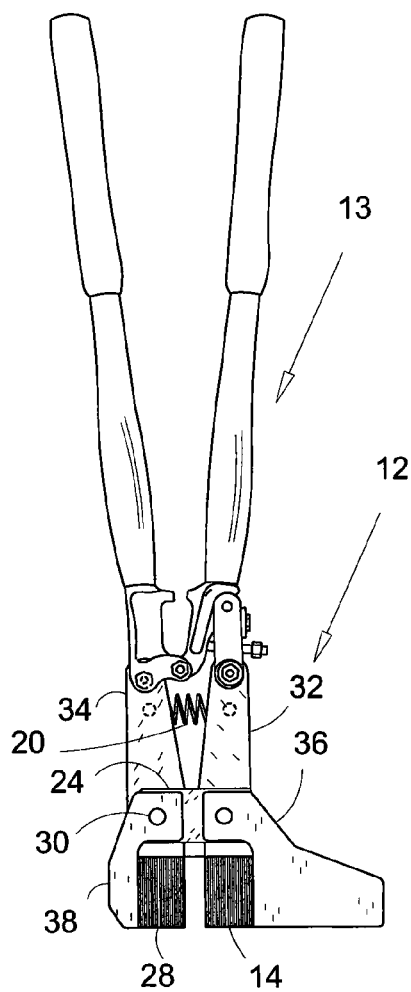

Lee B. McQuinn and Jerry E. McQuinn, have invented a device Titled "Universal Nutcracker" as shown and described in the following specification. A Design patent application on the decorative appearance of said device was filed on Apr. 10, 2013 and was issued Sep. 10, 20113 as D689343 S to the same two inventors and assigned to the same assignee.

There is no Federally sponsored Research and Development.

BACKGROUND OF THE INVENTION

1. Field of the Invention

This device is a tool for cracking various size and shape nuts.

2. Prior Art

Cutting tools for bolts, rods, nails are well known as are nipping devices for shaping horse hooves and for shaping tile and the like. Additional to providing jaws with gripper serrations where the opening between opposing jaws in the closed mode is slightly smaller than the smallest nut to be cracked, up to slightly smaller than the largest nut to be cracked, the invention is bolted to scissoring arms with linkage that provide a mechanical advantage to an operator to close the jaws.

Where scissoring arms that are closed together for closing opposing jaws with a mechanical advantage for bolt cutting are well known, none of the art shows its use as a nutcracker with a spring return assist of the moving handle to its normally open position. Also none of the art discloses a closed clearance slightly smaller than the smallest nut to be cracked at one end and slightly smaller than the largest nut to be cracked at the other end. Also none of the art discloses top and bottom jaws having serrations to better grip the nut while cracking.

SUMMARY OF THE INVENTION

It is a principle object of the present invention to provide a nutcracker that is suitable for cracking various size and hardness nuts.

Another object of the present invention is to provide a nutcracker that can be attached to scissoring arms that are linked to opposing jaws such that, when arms are manually operated to close together, the opening between opposing jaws will be slightly smaller than the diameter of the nut to be cracked.

Still another object of the present invention is to provide a nutcracker than can be connected to a linkage between the scissoring arms, and opposing jaws where a mechanical advantage exists such that a force of closing the scissoring arms together is increased at the opposing jaws, cracking the nut.

Still another object is to provide a nutcracker that is easily and efficiently operated with a spring return of the top handle after cycling the nutcracker.

The invention in a nutcracker allows for a plurality of size, shape and hardness nuts to be cracked without undue wear on the operators hand and wrist even with the hardest and strongest shell structure.

The invention provides a pair of opposing jaw support plates that each receive a jaw with a serrated face to grip the nut and of diminishing thickness providing the varying space between the closed jaws to allow for cracking varying diameter nuts. Further, the opposing jaws are connected to top and bottom levers which pivot with respect to each other and can be connected to a set of scissoring arms through a linkage whereby, an operator urges a pair of scissoring arms together, providing a mechanical advantage to the applied force to urge the jaws together at a sufficient force to easily crack the most difficult nut.

DRAWING FIGURES

Figure 5:
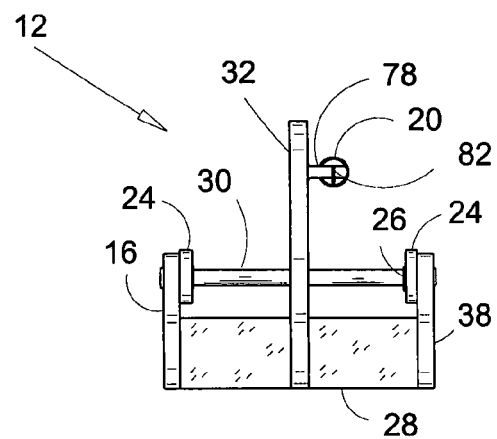
Figure 4:
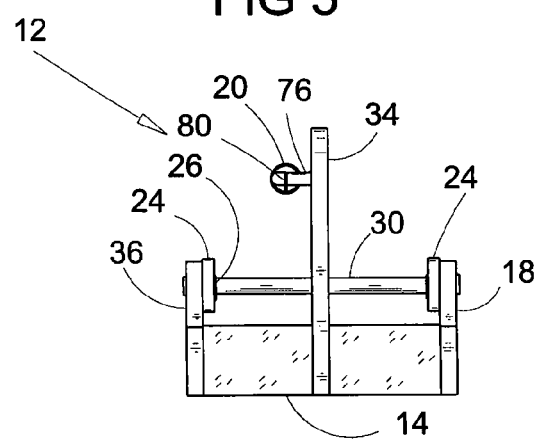
Figure 2:
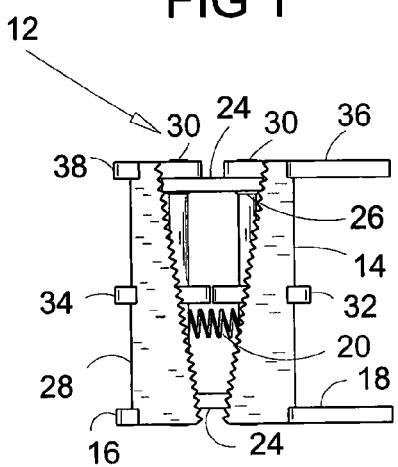
Figure 3:
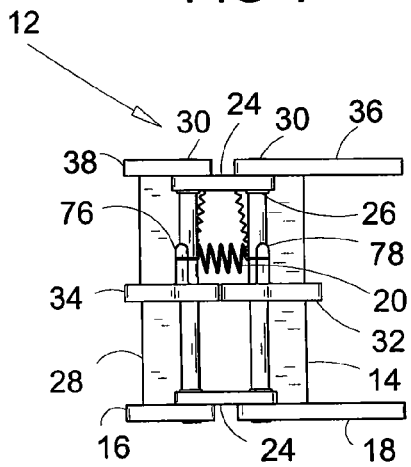
Figure 6:
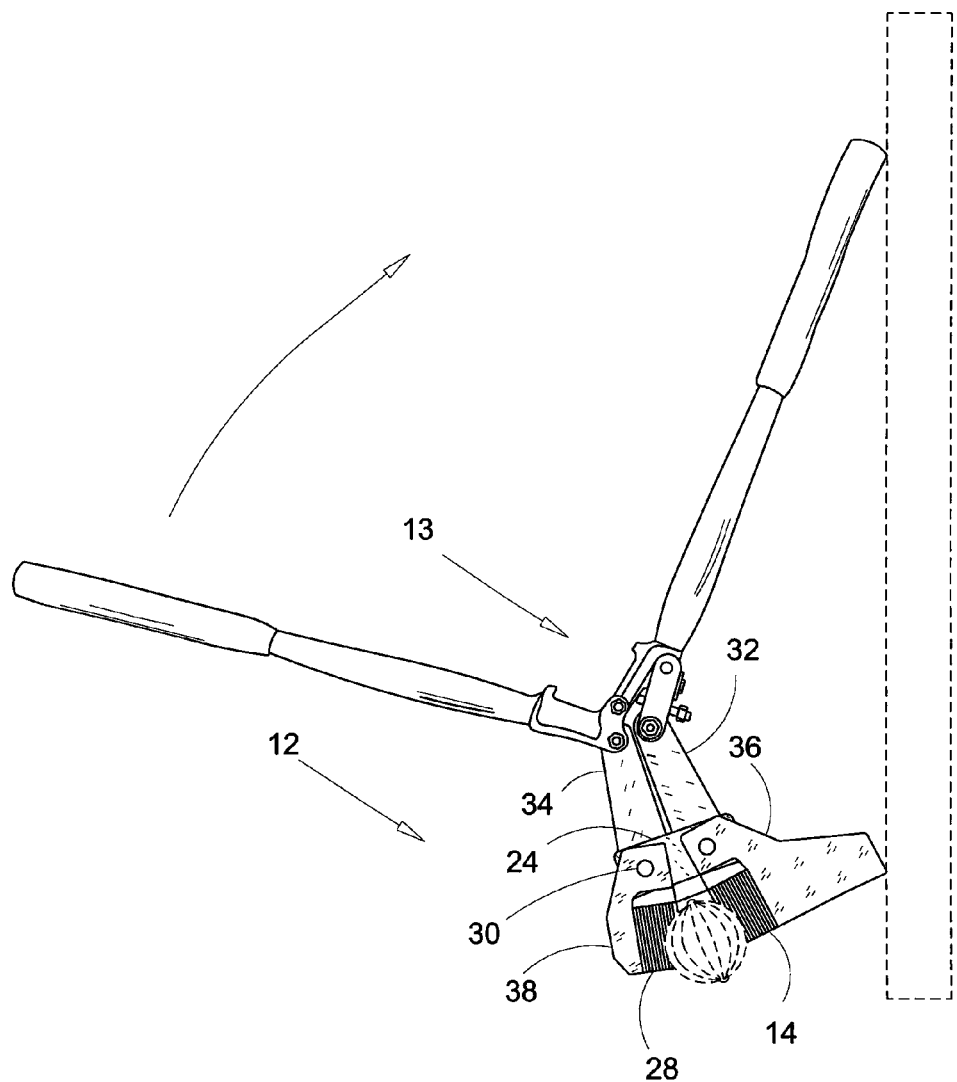
Figure 7:
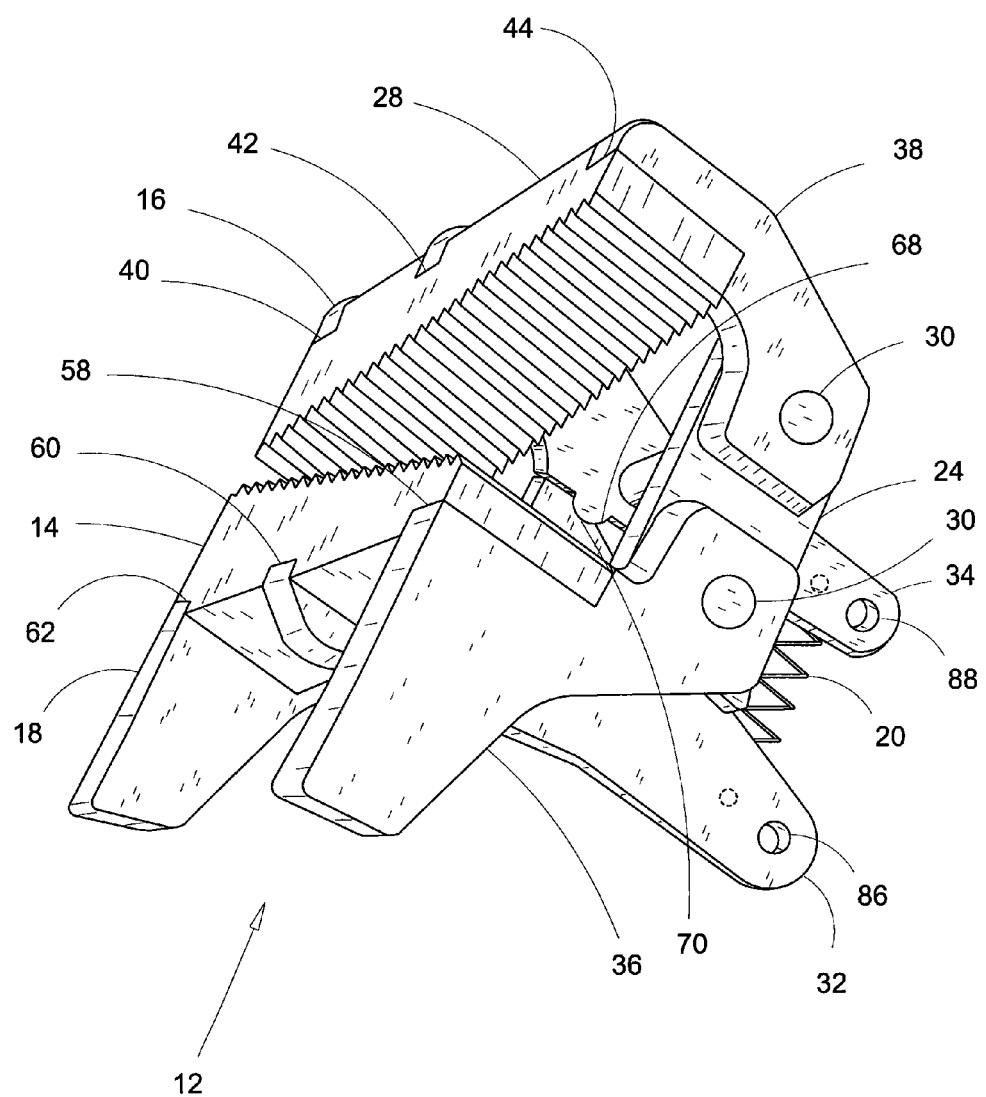
Figure 8:
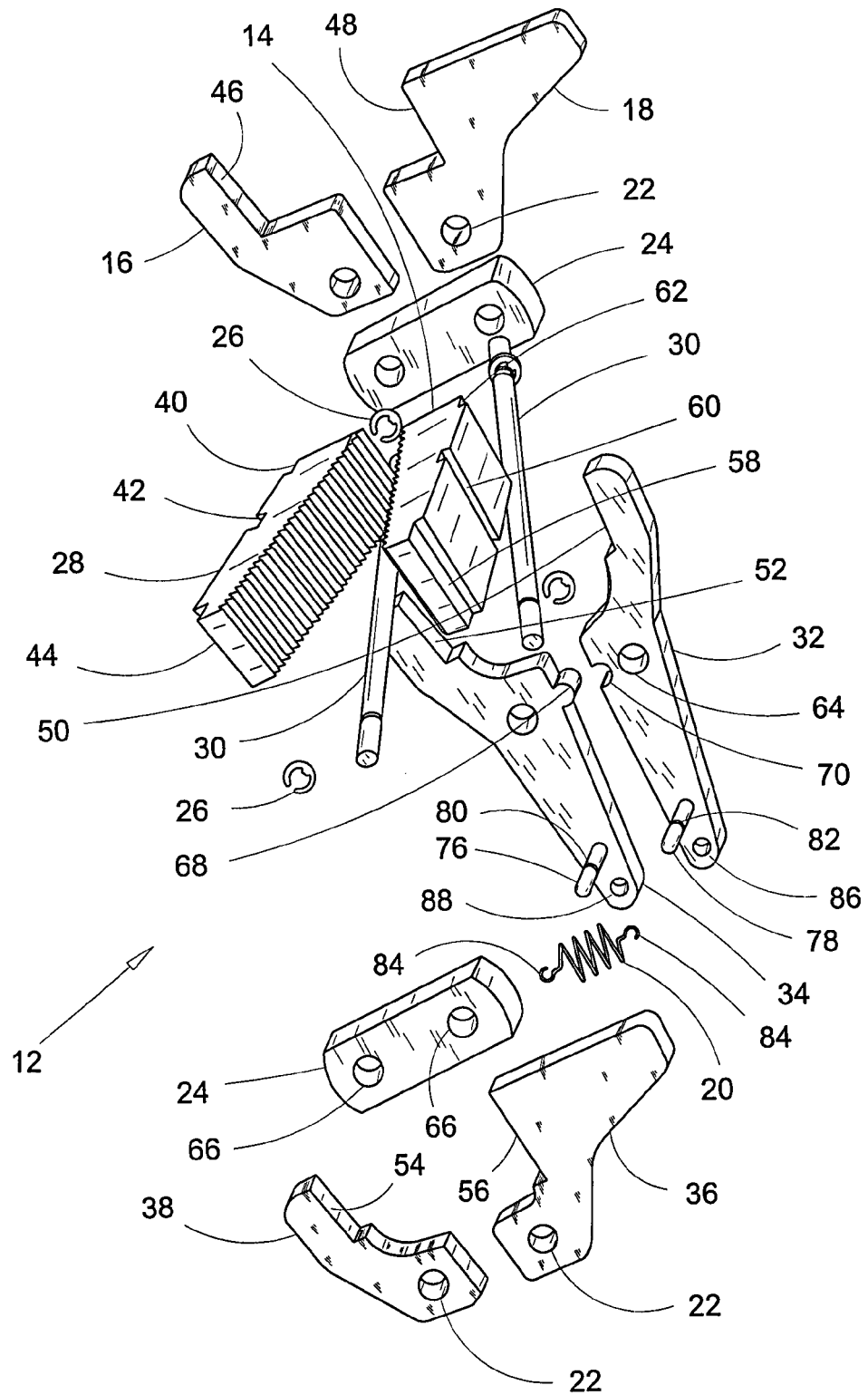
Figure 9:
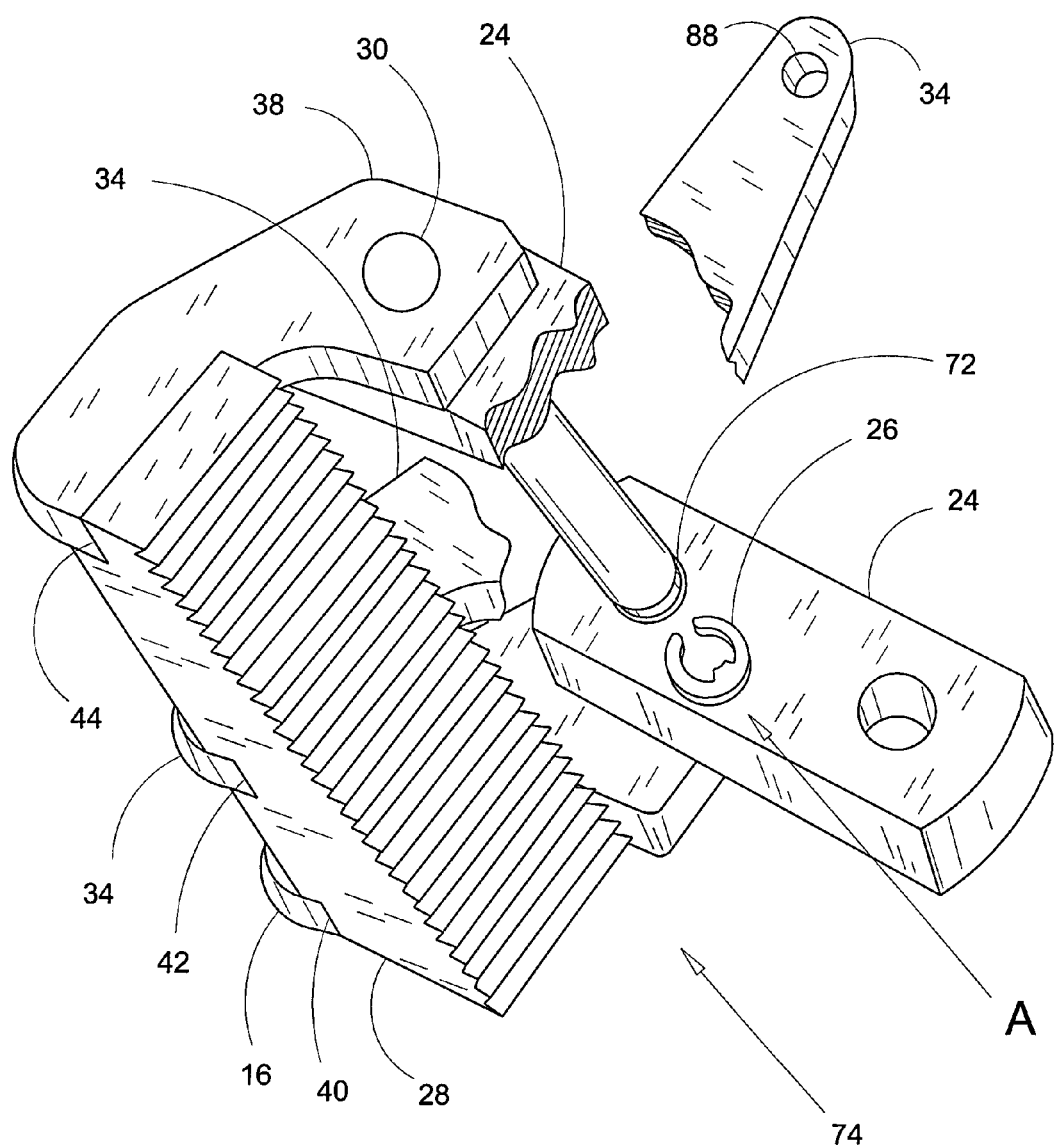

FIG. 1 is a side view of a Universal Nutcracker.
FIG. 2 is a front view thereof.
FIG. 3 is a back view thereof.
FIG. 4 is a top view thereof.
FIG. 5 is a bottom view thereof.
FIG. 6 is a side view thereof after it is opened.
FIG. 7 is an enlarged perspective view thereof.
FIG. 8 is an exploded view of the jaw and lever assembly.
FIG. 9 is a perspective view of the top jaw assembly showing the installation of the e-retaining ring.

Nuts, table top, linkage and stops are shown in broken lines as they are not part of this invention and are shown for illustrative purposes only.

DETAILED DESCRIPTION

Heretofore, nuts have been cracked using a myriad of different devices all of which require a certain amount of effort and wear and tear on the operator's hands and wrists. The Universal Nutcracker head assembly 12 allows an operator to crack as many nuts as he desires without any significant effort when coupled with scissor arms and linkage assembly 13. It also allows the most difficult nuts to be easily cracked.

A perspective view of the top jaw assembly 74 is shown in FIG. 9. Top right cap 38 is mounted to top jaw 28 fastening top right cap attachment surface 54 in top right notch 44 in top jaw 28. Top center lever 34 is mounted to top jaw 28 fastening top center attachment surface 52 in top center slot 42 in top jaw 28. Top left cap 16 is mounted to top jaw 28 fastening top left cap attachment surface 46 in top left notch 40 in top jaw 28.

Top shaft 30 is slipped through top left cap clearance hole 22 in top left cap 16, through link clearance hole 66 in link 24, through clearance hole 64 in top center lever 34, through link clearance hole 66 in second link 24, and finally through top right cap clearance hole 22 in top right cap 38 such that shaft 30's proximal and distal ends are equidistant from the outboard sides of top right cap 38 and top left cap 16. The two links 24 are pushed outboard until they are in contact with the inboard surfaces of top left cap 16 and top right cap 38 respectively, exposing two e-ring-retaining slots 72 in shaft 30. Two e-ring-retainers 26 are then snapped into slots 72 by pushing e-retaining ring 26 along direction A as shown in FIG. 9.

Similarly, bottom jaw 14 is assembled as shown in FIG. 7. Bottom right cap 36 is mounted to bottom jaw 14 fastening bottom right cap attachment surface 56 in bottom right notch 58 in bottom jaw 14. Bottom center lever 32 is mounted to bottom jaw 14 fastening bottom center lever attachment surface 50 in bottom center slot 60 in bottom jaw 14. Bottom left cap 18 is mounted to bottom jaw 14 fastening bottom left cap attachment surface 48 in bottom left notch 62 in bottom jaw 14.

Bottom shaft 30 is slipped through bottom left cap clearance hole 22 in bottom left cap 18, through second link clearance hole 66 in link 24, through clearance hole 64 in bottom center lever 32, through second link clearance hole 66 in second link 24, and finally through bottom right cap clearance hole 22 in bottom right cap 36 such that shaft 30's proximal and distal ends are equidistant from the outboard sides of bottom right cap 36 and bottom left cap 18. The two links 24 are pushed outboard until they are in contact with the inboard surfaces of bottom left cap 18 and bottom right cap 36 respectively, exposing two e-ring-retaining slots 72 in second shaft 30. Two e-ring-retainers 26 are then snapped into slots 72 by pushing e-retaining ring 26 along direction A as shown in FIG. 9. Torsion spring 20 is then attached between top spring retaining stud 76 on top center lever 34 and bottom spring retaining stud 78 on bottom center lever 32 by slipping hook ends 84 of spring 20 over spring retaining grooves 80 and 82 on the top spring retaining stud 76 on top center lever 34 and bottom spring retaining stud 78 on bottom center lever 32 respectively.

Shafts are typically formed from steel rod 5/16 inch diameter. Top and bottom jaws 28 and 14 preferably are made from steel for wear or aluminum for lighter weight. Left and right, top and bottom caps 16, 38, 18 & 36 are preferably made from ¼ inch thick aluminum. Top center lever 34 and bottom center lever 32 are preferably made from steel as the main pivot action between the top and bottom center levers occurs as convex radius 68 on top center lever 34 pivots in concave radius 70 in bottom center lever 32, but again depending on intended wear and durability the top and bottom center levers can be cast from aluminum. E-retaining rings 26 are standard off the shelf items. If top and bottom center levers 34 and 32 are cast, top spring retaining stud 76 on top center lever 34 and bottom spring retaining stud 78 on bottom center lever 32 can be cast as part of the mold operation and spring retaining grooves 80 and 82 machined in far enough axially away from sidewall of top center lever 34 and bottom center lever 32 that spring 20 does not contact side wall of top and bottom center levers 34 and 32. If top and bottom center levers 34 and 32 are made from steel, top spring retaining stud 76 and bottom spring retaining stud 78 can be turned as screw machine parts and screwed into tapped holes in top and bottom center levers 34 and 32. Towards the distal end of top and bottom center levers 32 and 34 are coupling holes 86 and 88 which are connected to a means lever and scissor arms with linkage assembly 13 for pivoting top and bottom center levers 32 and 34 around pivot 68 in radius 70 causing jaws 28 and 14 to open and close.

The Scissor arms with linkage assembly 13 for opening and closing top and bottom center levers 32 and 34 is preferably a standard bolt cutter type of scissor arms with linkage such that a mechanical advantage is provided to the operator when the arms are brought together. Scissor arms with linkage assembly 13 for top and bottom center levers 32 and 34 is shown in FIGS. 1 and 6 coupled to Universal Nutcracker head assembly 12 with standard bolt, nut, and washer assembly. Although the materials and dimensions can be scaled to produce as much mechanical advantage as desired, a standard 9 inch long lever set with bolt cutter linkage should be sufficient to crack virtually any type of nuts.

I claim:
1. A nutcracker comprising:
a torsion spring;
a first link with top and bottom shaft clearance holes;
a second link with top and bottom shaft clearance holes;
a top jaw with a top surface, a bottom surface, a right end, a left end, a front face and a back face where said top surface, said right end, said left end, said front face and said back face are all at right angles to said top surface, where said top surface has a top left notch on said left end running from said front face to said back face, a top right notch on said right end running from said front face to said back face, and a top center slot running from said front face to said back face, centered between said left end and said right end, where said top jaw has a height on said left end and a smaller height on said right end and said bottom surface has serrations running from said front face to said back face;
a top left cap with an outboard side, an inboard side, a proximal face, a top left cap attachment surface fastened in said top left notch with said proximal face of said top left cap flush with said front face of said top jaw and said top left cap outboard side flush with said left end of said top jaw, where said top left cap has a top shaft clearance hole;
a top center lever with a proximal end, a distal coupling end, a proximal face, a top center attachment surface fastened in said top center slot of said top jaw with said proximal face of said top center lever flush with said front face of said top jaw, a left side, a top side and a bottom side, where said top center lever has a top shaft clearance hole, a coupling hole towards distal end of said top center lever, a top spring retaining stud protruding from said left side of top center lever located toward said coupling hole, where said top spring retaining stud has a spring retaining groove a sufficient axial distance from said left side of said top lever arm as to exceed the radius of said torsion spring;
where said bottom side of said top center lever has a convex radius distending below said bottom side of said top lever the same thickness as said top lever located on the mid portion of said bottom side of said top lever;
a top right cap with a proximal face, an inboard side, an outboard side, with a top right cap attachment surface fastened in said top right notch with said proximal face flush with said front face of said top jaw and said outboard side being flush with said right end of said top jaw, where said top right cap has a top shaft clearance hole;
a top shaft with e-retaining ring grooves around shaft towards both ends at an axial distance from each end equivalent to the thickness of said top cap and said link;
a bottom shaft with an e-retaining ring groove around shaft towards both ends at an axial distance from each end equivalent to the thickness of said bottom cap and said link;
a bottom jaw with a top surface, a bottom surface, a right end, a left end, a front face and a back face where said bottom surface, said right end, said left end, said front face and said back face are all at right angles to said bottom surface, where said bottom surface has a bottom left notch on said left end running from said front face to said back face, a top right notch on said right end running from said front face to said back face, and a top center slot running from said front face to said back face, centered between said left end and said right end, where said bottom jaw has a height on said left end and a smaller height on said right end and said top surface has serrations running from said front face to said back face;
a bottom left cap with a proximal face, an inboard side, an outboard side, with a bottom left cap attachment surface fastened in said bottom left notch with said proximal face flush with said front face of said bottom jaw and said outboard side being flush with said left end of said bottom jaw, where said bottom left cap has a bottom shaft clearance hole;
a bottom center lever with a proximal end, a distal coupling end, a proximal face, a bottom center attachment surface fastened in said bottom center slot of said bottom jaw with said proximal face of said bottom center lever flush with said front face of said bottom jaw, a left side, a top side and a bottom side, where said bottom center lever has a bottom shaft clearance hole, a coupling hole towards distal end of said bottom center lever, a bottom spring retaining stud protruding from said left side of bottom center lever located toward said coupling hole, where said bottom spring retaining stud has a spring retaining groove a sufficient axial distance from said left side of said bottom lever arm as to exceed the radius of said torsion spring;

where said top side of said bottom center lever has a concave radius extending below said top side of said bottom lever located on the mid portion of said top side of said bottom lever;

a bottom right cap with an outboard side, an inboard side, a proximal face, a bottom right cap attachment surface fastened in said bottom right notch with said proximal face of said bottom right cap flush with said front face of said bottom jaw and said bottom right cap outboard side flush with said right end of said bottom jaw, where said bottom right cap has a top shaft clearance hole;

said convex radius on said top center lever pivots in said concave radius in said bottom lever when said clearance holes in said left and right top caps, said left and right bottom caps, said top and bottom levers and said links are properly spaced; and where said top shaft is slipped through said top left cap clearance hole, then through said top shaft clearance hole in first link, then through said top center lever shaft clearance hole, then through top shaft clearance hole in second link, then through top right cap clearance hole such that ends of said top shaft are equidistant from outboard sides of said top left cap and said top right cap, said first and second links are then pushed as far outboard as they can be exposing said e-retaining ring slots, e-retainers are snapped in place;

where said bottom shaft is slipped through said bottom left cap clearance hole, then through said bottom shaft clearance hole in first link, then through said bottom center lever shaft clearance hole, then through said bottom shaft clearance hole in second link, then through said bottom right cap clearance hole such that ends of said bottom shaft are equidistant from outboard sides of said bottom left cap and said bottom right cap, said first and second links are then pushed as far outboard as they can be exposing said e-retaining ring slots, e-retainers are snapped in place; and said torsion spring is connected between said top spring retaining stud and said bottom spring retaining stud slipping said spring end hooks into said spring retaining grooves providing an assist in opening said jaws; and where said coupling holes in said top and bottom center levers are provided for attaching to a scissoring arms with linkage assembly for spreading apart and closing together said coupling ends of said top center lever and said bottom center lever that provides a mechanical advantage to an operator while closing said jaws and cracking a nut.

\* \* \* \* \*